UNITED STATES PATENT OFFICE.

OWEN J. FLANIGAN, OF BOSTON, MASSACHUSETTS.

COMPOSITION FOR MAKING SOLDERING-STICKS.

SPECIFICATION forming part of Letters Patent No. 717,833, dated January 6, 1903.

Application filed April 26, 1902. Serial No. 104,796. (No specimens.)

*To all whom it may concern:*

Be it known that I, OWEN J. FLANIGAN, a subject of the King of Great Britain, residing in Boston, in the county of Suffolk and State of Massachusetts, have invented a new and useful Composition of Matter to be Used for Making Soldering-Sticks, of which the following is a specification.

The hereinafter-described composition is intended to be used in making soldering-sticks for uniting aluminium surfaces or aluminium with other metals or metallic compounds or alloys.

My composition consists of the following ingredients, combined in substantially the proportions stated, viz.: spermaceti, three-fourths of a pound; mutton-tallow, one-fourth of a pound; acetic acid, three-fourths of an ounce. These ingredients are mixed by inserting them in a suitable vessel, which is placed in a vessel of boiling water, so that the ingredients are dissolved and may be mixed by agitation or other means. The product while still hot is poured into a mold and after cooling is removed from the mold in the form of an ordinary soldering-stick, which may be applied to soldering pieces of aluminium together or aluminium with other metals, metallic compounds, or alloys.

What I claim, and desire to secure by Letters Patent of the United States, is—

1. The herein-described composition of matter consisting of spermaceti, mutton-tallow and acetic acid, substantially as described and for the purpose specified.

2. The herein-described composition of matter consisting of spermaceti three-fourths of a pound, mutton-tallow one-fourth of a pound, and acetic acid three-fourths of an ounce, substantially as described and for the purpose specified.

OWEN J. FLANIGAN.

Witnesses:
   HENRY W. WILLIAMS,
   A. N. BONNEY.